(12) United States Patent
Mercier et al.

(10) Patent No.: US 12,423,397 B2
(45) Date of Patent: Sep. 23, 2025

(54) METHOD FOR CHECKING INDIVIDUALS WITH SIMPLIFIED AUTHENTICATION

(71) Applicant: IDEMIA IDENTITY & SECURITY FRANCE, Courbevoie (FR)

(72) Inventors: Laurent Mercier, Courbevoie (FR); Pascal Duville, Courbevoie (FR); Joost Van Prooijen, Courbevoie (FR); Joel Viellepeau, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 121 days.

(21) Appl. No.: 18/261,597

(22) PCT Filed: Mar. 22, 2022

(86) PCT No.: PCT/FR2022/050527
§ 371 (c)(1),
(2) Date: Jul. 14, 2023

(87) PCT Pub. No.: WO2022/200730
PCT Pub. Date: Sep. 29, 2022

(65) Prior Publication Data
US 2024/0070247 A1 Feb. 29, 2024

(30) Foreign Application Priority Data
Mar. 24, 2021 (FR) .................................... 21 02940

(51) Int. Cl.
*G06F 21/32* (2013.01)
*G06F 21/35* (2013.01)

(52) U.S. Cl.
CPC .............. *G06F 21/32* (2013.01); *G06F 21/35* (2013.01)

(58) Field of Classification Search
CPC .................................. G06F 21/32; G06F 21/35
See application file for complete search history.

(56) References Cited

U.S. PATENT DOCUMENTS

| 8,517,263 | B1 * | 8/2013 | Daniel | .................... G06F 21/32 340/572.1 |
| 8,572,397 | B2 * | 10/2013 | Koster | ................ H04L 63/0861 713/186 |

(Continued)

FOREIGN PATENT DOCUMENTS

| EP | 2 474 931 A1 | 7/2012 | |
| WO | WO-2012089533 A1 * | 7/2012 | ............. G06F 21/35 |

OTHER PUBLICATIONS

International Search Report issued Apr. 28, 2022 in PCT/FR2022/050527, filed on Mar. 22, 2022, 2 pages.

(Continued)

*Primary Examiner* — Hee K Song
(74) *Attorney, Agent, or Firm* — Oblon, McClelland, Maier &Neustadt, L.L.P.

(57) ABSTRACT

A method for checking an individual having an identity document on a medium comprising an electronic chip in which a reference biometric datum of the individual is stored and capable of displaying an automatic reading zone representing an optical reading datum of the identity document, the method includes carrying out by a checking device of acquiring a candidate biometric datum on a biometric trait of the individual, retrieving from the candidate biometric datum in a memory, an optical reading datum associated with the reference biometric datum corresponding to the biometric trait of the individual, and opening a secure communication channel with the electronic chip of the medium of the individual's identity document using said retrieved optical reading datum.

19 Claims, 2 Drawing Sheets

(56) References Cited

U.S. PATENT DOCUMENTS

| | | | | |
|---|---|---|---|---|
| 2003/0115459 A1* | 6/2003 | Monk | G06Q 50/26 | |
| | | | 713/168 | |
| 2006/0293891 A1* | 12/2006 | Pathuel | G06F 21/32 | |
| | | | 704/E17.003 | |
| 2010/0052852 A1* | 3/2010 | Mohanty | B42D 25/333 | |
| | | | 380/243 | |
| 2010/0134246 A1* | 6/2010 | Kevenaar | G07F 7/1008 | |
| | | | 235/487 | |
| 2013/0243266 A1* | 9/2013 | Lazzouni | G06Q 50/265 | |
| | | | 382/115 | |
| 2014/0016839 A1* | 1/2014 | Uno | G06V 30/242 | |
| | | | 382/125 | |
| 2015/0286922 A1* | 10/2015 | Saito | G07C 9/257 | |
| | | | 340/5.82 | |
| 2017/0345235 A1 | 11/2017 | Touret et al. | | |
| 2018/0189561 A1* | 7/2018 | Bertan | G06V 30/412 | |
| 2020/0195636 A1 | 6/2020 | Landrock et al. | | |
| 2020/0342222 A1* | 10/2020 | Bahloul | H04L 9/3247 | |
| 2022/0078020 A1* | 3/2022 | Banchelin | G06F 21/445 | |
| 2022/0103362 A1* | 3/2022 | Chafni | G06V 40/13 | |
| 2023/0094432 A1* | 3/2023 | Sonna Momo | H04W 12/10 | |
| | | | 726/2 | |

OTHER PUBLICATIONS

French Preliminary Search Report issued Nov. 23, 2021 in FR 21 02940, filed on Mar. 24, 2021, 9 pages (with English Translation of Categories of Cited Documents & Written Opinion).

* cited by examiner

METHOD FOR CHECKING INDIVIDUALS WITH SIMPLIFIED AUTHENTICATION

TECHNICAL FIELD OF THE INVENTION

The invention relates to a method for checking an individual having an identity document on a medium comprising an electronic chip in which a reference biometric datum of the individual is stored and capable of displaying an automatic reading zone representing an optical reading datum of the identity document. The invention applies in particular to the checking of individuals for access to a protected zone or service, such as access to the boarding area of an aircraft.

STATE OF THE ART

Identity checks are sometimes required when an individual accesses a protected zone or service, such as when crossing a border or boarding an aircraft.

Electronic identity documents such as passports or electronic identity cards make it possible to carry out an identity check by biometric authentication, that is by comparing a biometric datum acquired from a biometric trait of the individual with a biometric datum pre-recorded in a chip contained in the identity document.

Such documents make it possible to increase security since the biometric datum that is contained in the document can be protected and signed by an official entity that issued the document, which is something that can be verified during checking.

They also make it possible to automate the identity checks carried out, by means of dedicated checking devices, by allowing the individuals to handle their own passports to submit them, for reading, to a checking device.

However, the physical handling of identity documents, and especially of documents in booklet form like passports, can pose difficulties to the individual seeking to identify themselves.

In fact, the biometric data contained in the identity documents are read-protected. It is necessary in order to access them to obtain the number of the identity document, which appears in an automatic reading zone, also referred to as MRZ (Machine-Readable Zone). Such an automatic reading zone is part of the surface of the document (or, when necessary, of one of the pages thereof) having text printed in a standardized format, so as to be readable by a computer and decrypted by optical recognition of the printed characters.

As a result, in order to be able to carry out the authentication, the individual must present the document on the particular page on which the automatic reading zone is located, in a specific direction allowing a reader of the checking device to read it. Once the number has been acquired, it can be used to access the contents of the chip.

As a result, unless the identity document is correctly presented, the authentication of the individual may fail.

This physical handling step is time-consuming and tends to result in lengthy queues, for example in airports. It is additionally the cause of a substantial proportion of individual authentication failures.

It is therefore necessary, in order to shorten the queues at checkpoints, to limit as much as possible the handling of these documents to authenticate an individual during checking.

A solution to this problem has already been proposed. It provides for splitting the checking of the individual into two steps, a first step during which handling of the identity document is necessary, and a second step during which the authentication takes place, without handling of the identity document.

More precisely, during a first step, an individual handles their passport to position it correctly on a reader of a checking device, which reads the automatic reading zone of the passport, and accesses the biometric datum, in this case an image of the individual's face, contained in the passport.

A number is associated with this biometric datum, and a ticket with this number is issued to the individual. The datum as well as the number are recorded in a database.

During the second step, the individual presents the ticket to a second checking device. This device reads the number printed on the ticket and accesses the database in order to retrieve the corresponding biometric datum.

At the same time, a photograph of the individual is taken by the checking device, and this photograph is compared with the biometric datum retrieved from the base (which matches that stored in the passport) in order to conduct the biometric authentication of the individual.

This solution thus makes it possible to shift the time-consuming step of handling the passport upstream of the authentication step which grants access to the secure zone, and to shorten the queues for this step.

However, this solution does not completely solve the problem, since the ticket issued to the individual is an additional document to be kept, which could be lost or exchanged. Moreover, it is still necessary to handle this ticket during the second step, which can still take time and cause errors.

More recently, document EP3249569 has proposed an optimization of the process. For this, during each step a photograph of the individual is taken, so that during the second step the identity document number corresponding to the biometric trait of the individual is retrieved from the database.

This does away with the handling of the identity document or even of an additional document (ticket) during the second step comprising the biometric authentication of the individual, and this simplifies and speeds up the passing of this step.

This solution is entirely satisfactory, but it would be desirable to make it even easier, while still retaining full security.

BRIEF DESCRIPTION OF THE INVENTION

The invention aims to solve the problems described above. In particular, one of the aims of the invention is to propose an automatic checking method that minimizes the handling of documents by the individual.

Another aim of the invention is to reduce the time necessary for carrying out the authentication step.

Another aim of the invention is to propose a checking method which is easy and practical to carry out for the individuals.

In this regard, the invention relates to a method for checking an individual having an identity document on a medium comprising an electronic chip in which a reference biometric datum of the individual is stored and capable of displaying an automatic reading zone depicting an optical reading datum of the identity document, the method comprising carrying out by a checking device of steps of:

(a) acquiring a candidate biometric datum from a biometric trait of the individual;

(b) from the candidate biometric datum, retrieving, in a memory, an optical reading datum associated with the reference biometric datum corresponding to the biometric trait of the individual;

(c) opening a secure communication channel with the electronic chip of the medium of the individual's identity document using said retrieved optical reading datum.

According to advantageous and non-limitative characteristics:

Step (c) does not comprise either retrieving the reference biometric datum of the individual from said electronic chip via said secure communication channel or reading said automatic reading zone of the identity document medium.

Step (c) comprises authenticating said electronic chip via said secure communication channel.

Said electronic chip stores a private and public key pair, said authentication of said electronic chip being chosen from an active authentication and a hardware authentication.

Said authentication of said electronic chip is an active authentication comprising verification using said public key of an electronic signature received from the electronic chip in response to the sending of a nonce.

No datum other than the data necessary for said authentication of the electronic chip is transmitted via said secure communication channel.

Said secure channel is opened in accordance with a protocol chosen from Basic Access Control, BAC, and Password Authenticated Connection Establishment, PACE, using a key derived from said retrieved optical reading datum.

Step (b) comprises:
comparing reference biometric data stored in the memory with the candidate biometric datum, and
selecting at least one optical reading datum of an identity document corresponding to at least one reference biometric datum having a rate of similarity with the candidate biometric datum greater than a predetermined threshold.

If more than one optical reading datum of an identity document has been selected, step (c) is attempted for each optical reading datum selected until the secure communication channel opens.

The checking device comprises contactless communication means, step (c) being carried out by placing said medium near the checking device in any given orientation.

The method comprises a prior step (a0) carried out by an enrollment device, of retrieving the reference biometric datum of the individual from said electronic chip; of acquiring the optical reading datum of the identity document by reading the automatic reading zone; and of recording, in said remote memory (20), the optical reading datum of the identity document linked to the reference biometric datum of the individual.

The identity document is a passport, and:
during step (a0), the passport is presented to the enrollment device open on the page of the automatic reading zone in order to acquire the optical reading datum of the identity document, and
during step (c), the passport is presented closed to the checking device.

According to a second aspect, the invention relates to a device for checking an individual having an identity document on a medium comprising an electronic chip in which a reference biometric datum of the individual is stored and capable of displaying an automatic reading zone depicting an optical reading datum of the identity document, configured to carry out steps of:

(a) acquiring a candidate biometric datum on a biometric trait of the individual;
(b) from the candidate biometric datum, retrieving, in a memory, an optical reading datum associated with a reference biometric datum corresponding to the biometric trait of the individual;
(c) opening a secure communication channel with the electronic chip of the medium of the individual's identity document using said retrieved optical reading datum.

According to a third aspect, the invention relates to a system for checking individuals, comprising:
a memory,
a checking device according to the second aspect, and
an enrollment device, configured to carry out steps of retrieving the reference biometric datum of the individual from said electronic chip; of acquiring the optical reading datum from the identity document by reading the automatic reading zone; and of recording, in said remote memory, the optical reading datum of the identity document linked to the reference biometric datum of the individual.

According to a fourth and fifth aspect, the invention relates to a computer program product comprising code instructions for executing a method according to the first aspect of checking an individual; and a computer-readable storage means on which a computer program product comprises code instructions for executing a method according to the first aspect of checking an individual.

DESCRIPTION OF THE FIGURES

Other characteristics, purposes and advantages of the present invention will be seen from the following detailed description with regard to the appended figures, provided by way of non limiting example, and wherein.

DETAILED DESCRIPTION OF AT LEAST ONE EMBODIMENT OF THE INVENTION

Architecture

Figure 1:
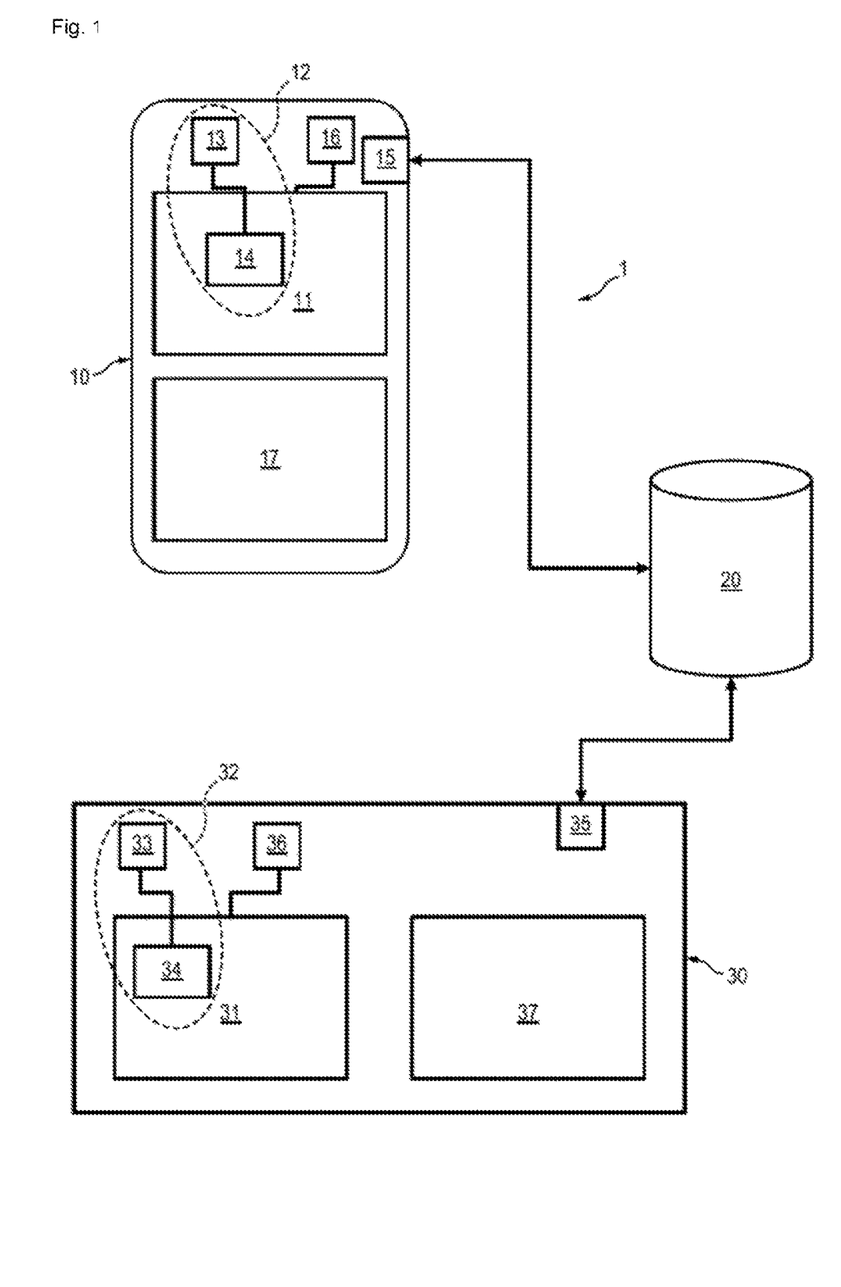
FIG. 1 schematically represents a checking system for carrying out the method according to the invention, FIG. 2 schematically represents the main steps of a preferred embodiment of the checking method according to the invention.

In reference to FIG. 1, a system for checking individuals 1 is represented. This system makes it possible to carry out biometric authentication of individuals in order to authorize or prohibit the access of individuals to a secure zone or service.

In order to be able to carry out checking, the individual must have a physical or dematerialized identity document. In both cases, they have a physical medium of the identity document According to a first embodiment, the identity document is a physical document (i.e. the medium is the document), such as a passport or an identity card, or a chip card ("smartcard"), comprising an electronic chip, for example an RFID chip, wherein at least one biometric datum is stored, acquired from a biometric trait of the individual.

The biometric datum contained in the identity document is hereinafter qualified as reference biometric datum (as opposed to a candidate biometric datum, acquired on the fly on the individual).

The electronic chip likewise generally stores various alphanumerical data of the individual, which are in practice printed on the medium of the identity document if it is "physical", referred to as "visual data", especially chosen from:
Complete number of the identity document;
Expiration date;
Issue date;
Surname;
Given name(s);
Nationality;
Date of birth;
Place of birth;
Sex;
Height;
Address;
Etc.

Each identity document further has an automatic reading zone depicting an optical reading datum (i.e. intended to be easily transmitted in a visual manner to computers), for example such as MRZ, QR code or PDF417, also printed on the medium for a physical document. The automatic reading zone of a document is reserved for reading, identifying and validating this document.

A distinction is made between the optical reading datum, which is a numerical datum (generally also stored in the electronic chip) coding for a set of information and in particular some of said visual data (at least the identity document number, the date of birth of the individual, and/or the expiry date of the identity document, in practice the concatenation thereof), referenced "DG1" in the ICAO specifications (the reference biometric datum is referenced "DG2", and a certain number of optional information is referenced DG3 to DG16), and the depiction thereof for optical reading, which is the automatic reading zone, in a format readable by a computer or any equivalent processing unit able to carry out optical acquisition and extraction of the optical reading datum and decode same. In other words, the optical reading datum is the content of the optical reading zone.

In the case of MRZ, the representation of the optical reading datum is a character chain (and reading same implies optical character recognition), and in the case of QR code it is a 2D barcode. In the rest of the present description, the preferred example of the MRZ is described and, somewhat inaccurately, MRZ is used to designate the corresponding optical reading datum. The MRZ is standardized by the ICAO (ICAO 9303), as described in standard ISO/CEI 7501-1:2008 (and the ICAO supplement).

In the preferred case of a passport, this document is presented in the form of a booklet comprising covers and a set of pages, the automatic reading zone (in MRZ format) appearing on one of the pages of the booklet, which requires opening the passport on the right page and correctly positioning it in order to read this zone.

According to a second embodiment, the identity document is dematerialized on a user terminal such as a smartphone or a smartwatch, i.e. the medium for the document is said terminal; however, in practice, an electronic chip (a processor of the terminal and storage means—for example flash memory) and the same data are also found. Such a terminal preferentially comprises contactless communication means (typically NFC, but also BLE, or UWB, and generally any near-field wireless communication) allowing it to exactly reproduce the operation of an RFID chip such as that of a passport.

The only difference with a physical identity document is that while the "dematerialized" document also includes the same optical reading datum, the automatic reading zone (its depiction as MRZ, QR code or PDF417) is not printed on the medium and can only be displayed on request. More precisely, this datum is also stored in the storage means of the terminal, to be displayed on an interface of the terminal. This display advantageously reproduces the original appearance of a physical identity document, for example by displaying the entire page of the equivalent passport.

In short, it is understood that regardless of its format, the medium of the individual's identity document will always comprise an electronic chip which stores a reference biometric datum of the individual, and also allows the visual provision of an optical reading datum of the identity document, whether this is simply displayed or physically printed on the medium.

The system for checking individuals can, for example, make it possible to check individuals prior to boarding an airplane or before crossing the border of a country.

The system for checking individuals 1 comprises a checking device 30, a memory 20, and potentially an enrollment device 10.

The checking device 30 is advantageously arranged at the entrance to a secure access zone. It can be in the form of a gantry which the individual is only authorized to cross when checking is successful.

The enrollment device 10 is advantageously a stationary checking structure such as a kiosk, possibly located in the same infrastructure (for example the same building) as the checking device 30 and at a distance from same (in the case of a check in an airport before boarding an airplane, the enrollment device can be located in the same departure terminal as the checking device. However, it is not located in the queue for the checking device, in order to be able to split the stream of individuals using the two devices), but alternatively in an official building such as a city hall or any other trusted entity. Indeed, as will be seen, the enrollment device, which must be secured, only needs to be used once initially, and then the present method for checking an individual can be carried out a large number of times. In other words, there is no need for enrollment before each check, unlike in the known methods of the state of the art The enrollment device 10 comprises a computer 11, for example such as a processor, a microprocessor, a controller, etc.

It also comprises a module 12 for reading the content of the optical reading datum of a document. The module 12 can, for example, comprise an image sensor 13, for example such as a digital photography device or a digital camera, suitable for acquiring an image of the automatic reading zone, and a character recognition module 14. The module 14 can be a software application which can be executed by the computer 11 or alternatively a hardware module. This may be the case when, for example, the checking device is the mobile phone or the tablet or the personal computer of the individual, and the device is configured to carry out character recognition. Alternatively, the image of the automatic reading zone can be processed remotely if the individual's device does not have this functionality. In this case, the module 14 can be a software application executable by a computer of another remote processing unit of the enrollment device (not shown), and the enrollment device 10 then comprises an interface for communicating with the remote processing unit allowing to send it the image of the automatic reading zone on which the character recognition is to be carried out.

The enrollment device 10 further comprises a reader 16 of a chip of an identity document. Typically, either the chip contained in the medium of the identity document is a radiofrequency chip (for example an RFID radiofrequency tag or a UHF chip), or the medium comprises contactless communication means (such as NFC, etc.), and the reader 16 is suitable for reading the content of the chip remotely, by radiofrequency communication with the chip.

Finally, the enrollment device 10 comprises an interface 15 for remote communication with a memory 20 of the checking system 1. This interface enables the computer 11 to exchange information with the memory 20. The memory 20 is advantageously remote from the enrollment device 10. As a result, the communication interface 15 is preferably the combination of a wired communication interface, for example Ethernet, or wireless communication interface, for example of the Wi-Fi or Bluetooth type or mobile telephone network (GPRS, 3G, 4G or other) and any other downstream communication network providing the link with the memory 20.

Advantageously, but optionally, the enrollment device 10 may ultimately comprise an information input interface 17 such as a keyboard, a touch screen, etc.

The checking device 30 comprises a computer 31, which may also be a processor, microprocessor, controller, etc.

In addition, the checking device 30 comprises a module 32 for acquiring a biometric datum from a biometric trait of an individual. The biometric trait can for example be the shape of the face, one or more fingerprints of the individual, or even one or more irises of the individual. It can also be the structure of the venous network of one or more fingers of one or both hands, or the respective sizes of the phalanges or fingers.

The module for acquiring the biometric datum 32 comprises an image sensor 33, and an image-processing module 34 suitable for extracting a biometric datum from an image of a biometric trait. The extraction of the biometric data is achieved by processing the image of the biometric trait, which depends on the nature of the biometric trait. Methods for processing a variety of images in order to extract biometric data are known to the person skilled in the art. By way of non-limiting example, the extraction of the biometric datum can comprise an extraction of minutiae of the fingerprints from an image of fingerprints. Alternatively, it can comprise an extraction of particular points or a shape of the face in the case in which the image is an image of the individual's face, etc. Alternatively, a convolutional neural network may be used.

The memory 20 of the checking system 1, already mentioned above, can be a memory integrated in the checking device 30. Alternatively, it can be a memory remote from the memory of the checking device 30, advantageously a database. In this case, the latter also comprises an interface for remote communication 35 with the memory 20.

Finally, the checking device 30 comprises a reader 36 of a chip of an identity document. Typically, either the chip contained in the medium of the identity document is a radiofrequency chip (for example an RFID radiofrequency tag or a UHF chip), or the medium comprises contactless communication means (such as NFC, etc.), and the reader 36 is suitable for reading the content of the chip remotely, by radiofrequency communication with the chip.

The checking device 30 can also comprise an information input interface 37 such as a keyboard, a touch screen, etc.

The system 1 is suitable for carrying out the checking method described hereunder.

Enrollment

Figure 2:
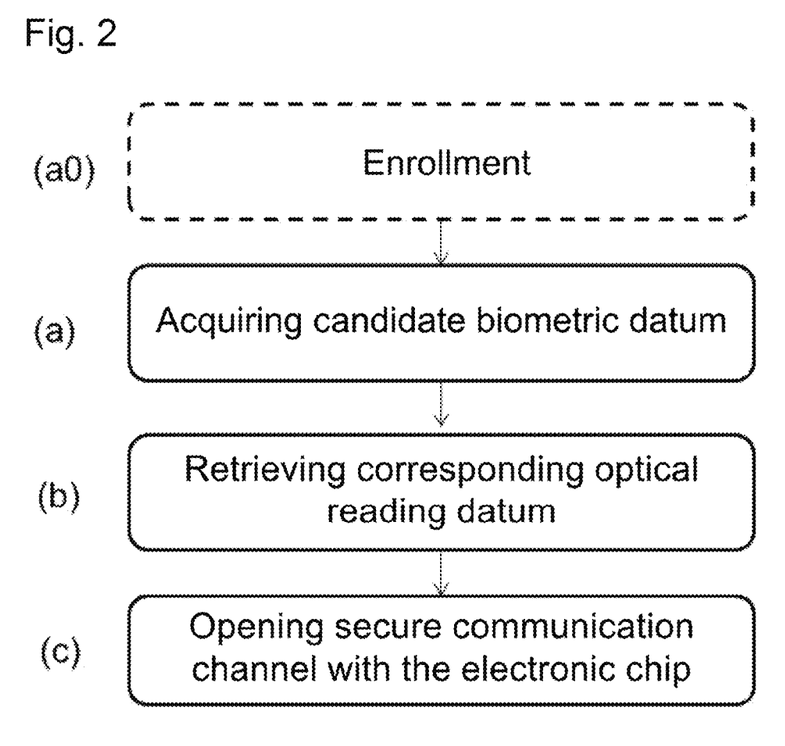

In reference to FIG. 2, the main steps of a method for checking an individual have been represented. This method makes it possible to verify that the individual presenting for the check corresponds to the individual to whom the identity document has been issued, by carrying out a biometric authentication by comparing a biometric datum freshly acquired from the individual with the biometric authentication datum stored in the chip contained in the document.

The method advantageously includes a prior enrollment step (a0) carried out by the enrollment device 10. As explained, this step only needs to be carried out once, and then the method can be carried out without comprising it. It should be noted that, preferably, it will be foreseen for it to be carried out again at regular intervals, for example once per year, for security.

Step (a0) aims to create an entry in the memory 20 corresponding to the identity document of the individual, and typically consists of generating a DTC of the individual. DTC (Digital Travel Credentials) is understood to be a container of the virtual version of an identity document, in a form that is recognized by the ICAO, see in particular the presentation https://www.icao.int/Meetings/TRIP-Symposium-2019/PublishingImages/Pages/Presentations/Digital%20Travel%20Credentials.pdf. In other words, the DTC contains all or part of the aforementioned data of an identity document, in particular the optical reading datum (DG1) and the reference biometric datum (DG2). Thus, step (a0) may be seen as a dematerialization of the individual's identity document. It should be noted that the fact of using a terminal as a medium for the identity document already implies that the DTC exists and is loaded into the memory of the terminal, so that step (a0) in theory only needs to be carried out in the case of a physical identity document.

Thus, step (a0) comprises first retrieving the reference biometric datum of the individual from said electronic chip and acquiring the optical reading datum from the identity document by reading the automatic reading zone. This action is conventional and can be carried out in a conventional manner (as is often done today at checking devices in airports, generating queues). It requires the individual to handle the identity document to present their document to the sensor 13, on the page with the automatic reading zone, and with the automatic reading zone in view of the acquisition zone of the sensor 13, that is presented in a position and in a direction that allow the sensor to acquire an image of the zone. The reading module 12 of the enrollment device 10 acquires an image of the automatic reading zone and extracts from such zone the optical reading datum of the document. The retrieval of the reference biometric datum can be substantially simultaneous since the optical reading datum can be used to access the contents of the chip and to retrieve the reference biometric datum.

Alternatively, several biometric data of the individual corresponding to different biometric traits may be available and retrieved. For example, a first biometric datum from the iris of the individual, and a second one from the face, or from the fingerprint, etc.

Then, the enrollment device 10 records, in said memory 20, the optical reading datum of the identity document linked to the reference biometric datum of the individual. By way of non-limiting example, a datum can be generated by the computer 11, comprising the optical reading datum and the reference biometric datum, for example in the form of a doublet, and stored in the memory. Both data are thus associated in the memory 20.

The fact of recording several biometric data linked to the optical reading datum of the identity document can enable the method to be compatible with different technologies implemented at different checkpoints, or to increase the security of the method, by subsequently using a plurality of biometric data in the method in order to find the optical reading datum.

Advantageously, but optionally, step (a0) of the method may also comprise the acquisition (or retrieval from the electronic chip, like for the reference biometric datum) of additional data comprising:

Identity data relative to the individual, these data can be for example compared with data appearing on the identity document and enabling enhanced security of the check (for example, surname, given name(s), date and place of birth), Data which make it possible to differentiate the individual among a set of individuals passing through the same check. For example, in the case of boarding for a flight, the data can comprise the flight number, the name of the airline, the destination and/or origin airport, etc. Alternatively, in the case of a border crossing, it can be a visa number, a country of origin, etc. and/or A public key, for example referenced DG14 or DG15, see hereunder.

This acquisition of additional data is advantageously carried out before recording in the memory, and in this case the data that make it possible to differentiate the individual are also recorded at the same time linked to the optical reading datum of the identity document and the reference biometric datum of the individual.

Method for Checking Individuals

The checking method itself is carried out by the checking device 30. This step can be carried out in an entirely decorrelated manner from the enrollment (a0).

The individual goes up to the checking device 30 and presents to the biometric datum acquisition module 32 the same biometric trait as that from which the reference biometric datum was obtained. A candidate biometric datum is acquired from this trait during a step (a).

During a second step (b), the checking device 30 retrieves in the memory 20, from this candidate biometric datum, the optical reading datum of the document previously recorded for the same individual. To do this, the device searches in the memory 20 for a reference biometric datum corresponding to the candidate biometric datum, that is which was acquired from the same trait, by comparing the candidate biometric datum with the reference biometric data recorded in the memory. A match is established if a similarity rate between two biometric data exceeds a predetermined threshold, which depends on how the comparison is established and on the nature of the biometric trait. A non-limiting example of carrying out a comparison between two data is by a calculation of distance (Euclidean distance, Hamming distance, etc.) between the data.

The checking device 30 then retrieves the optical reading datum of a document corresponding to each of the reference biometric data that matches the candidate biometric datum beyond said threshold. The checking device 30 can thus retrieve one or more optical reading data of documents.

If several reference biometric data corresponding to different biometric traits have been retrieved during the enrollment (a0), then either several candidate biometric data are acquired on the same traits in step (a) and are used for step (b) to search for the optical reading datum of the identity document, which increases the security, or a single candidate biometric datum is acquired and used for step (b). The diversity of data acquired in step (a) makes it possible in this case to increase the compatibility of the method with different checking devices 30.

In the case in which, during the enrollment (a0), additional data that make it possible to differentiate the individual have been recorded linked to the first biometric datum and the document number, step (a) may further comprise the acquisition of additional data, during which the individual re-enters the same datum or data as during the enrollment (a0). Advantageously, this entry is not necessary if these additional data are intrinsically and thus previously known by the checking device 30, for example due to its location if these data designate the airport in which the checking device 30 is located.

The optional additional data are advantageously used in step (b) to restrict the set of reference biometric data of the memory to be compared with the candidate biometric datum, by only selecting the biometric data recorded in the memory linked to the same additional data (for example, same country of origin, etc.).

This speeds up carrying out step (b) and reduces the number of optical reading data of documents obtained at the end of this step.

Then the method comprises a main step (c) during which the individual presents their document to the reader 36 of the checking device 30. In this step (c), the checking device 30 opens, or at least attempts to open, a secure communication channel with the electronic chip of the medium of the individual's identity document using said retrieved optical reading datum.

The trick is that step (c) does not comprise either retrieving the reference biometric datum of the individual from said electronic chip via said secure communication channel, or reading said automatic reading zone of the identity document medium.

Initially, since the reader 36 only interacts with the electronic chip, and not with the automatic reading zone, it is not necessary to present the document open or in a particular direction. In particular, the passport can be presented closed, in any orientation. This involves considerable time savings for the individual, who does not need any particular handling of the identity document, or of any other document whose reading zone or barcode needs to be read, and does away with the risk of failures linked to this handling.

But above all, normally, the checking device 30 would have needed to read the content of the chip of the document in order to retrieve the authentication biometric datum from the one or more optical reading data that it holds, which takes a rather long time.

In this case, the biometric authentication has already in fact taken place, since it was possible to identify at least one reference biometric datum corresponding to the candidate biometric datum, and it is only needed to verify this authentication (and uniquely identify the individual if there was still any ambiguity) and make sure that the individual actually has the corresponding identity document.

Here, it suffices to check that the secure communication channel can be opened, without retrieving data from the chip, which only takes a very short time, further speeding up the flow of users passing through the checking device 30. Moreover, the user does not need to leave their medium on the reader 36 for several seconds; they can swipe it near the reader briefly (less than 1 second), thus reducing contact and the risk of surface contamination.

The reader 36 opens the channel using said retrieved optical reading datum as a password. In the case in which several numbers were retrieved at the end of step (b), the reader attempts to open the channel by trying the retrieved optical reading data one after the other until finding the ones that correspond to the individual's identity document and which authorizes access to the content of the chip.

In a known manner, said secure channel is opened according to a protocol chosen from Basic Access Control, BAC, and Password Authenticated Connection Establishment, PACE, using a key derived from said retrieved optical reading datum. In particular, said key is preferentially, in accordance with ICAO specifications, for an MRZ optical reading datum, a hash of the concatenation of the identity document number, of the date of birth of the individual, and of the expiry date of the identity document.

In the case where the medium is a mobile terminal, step (c) can in fact comprise opening two nested channels: a first "protocol" channel between the contactless communication module of the terminal and the reader 16 (for example a BLE channel), and in this channel the "application" secure communication channel is opened using said retrieved optical reading datum.

In a particularly preferred manner, step (c) comprises authenticating said electronic chip via said secure communication channel, in particular an active authentication or a hardware authentication ("chip authentication"), and another possibility to be mentioned is PACE with chip authentication mapping (PACE-CAM), for these three mechanisms see part 11 of the ICAO 9303 specification (chapter 6).

Indeed, the opening of the secure channel makes it possible to ensure that the individual is actually holding an identity document medium with a chip that contains the expected data, but it could be forged. "Cloning" is the fraudulent action that consists of duplicating an identity document by manufacturing a fake medium (and typically by using an unauthorized medium) comprising an electronic chip onto which the data read from the original chip are copied.

To prevent this, the original/authorized chips store a private and public key pair, the private key being inaccessible for reading and the public key being accessible (for example referenced DG14 for chip authentication and referenced DG15 for active authentication). It should be noted that this public key can be retrieved using the secure channel (it is considerably lighter than the biometric datum for example), or else can have been directly retrieved during the creation of the DTC (enrollment step (a0)), which is preferred to avoid any need to read data on the electronic chip. Thus, it is possible to copy the public key when attempting to clone the chip, but not the private key.

Chip authentication is well known to a person skilled in the art, and is based on a Diffie-Hellman key agreement protocol and consists of an exchange of public keys with the electronic chip (the electronic chip provides its so-called static public key, and the checking device 30 provides a so-called ephemeral public key), then the generation of a common secret (the electronic chip uses its private key corresponding to the static public key and the checking device uses its private key corresponding to the ephemeral public key), and finally the change of the encryption key of the secure channel based on this common secret (the new session key is derived from the common secret). If the checking device 30 "understands" the identity document after this key change (i.e. each party has correctly obtained the same session key), then the electronic chip of the identity document is correctly authenticated.

In the other more recent case of active authentication, this authentication is said to be active because it involves a challenge/response mechanism: said active authentication of said electronic chip comprises verification (by the checking device 30) using said public key of an electronic signature received from the electronic chip in response to the sending of a nonce (the challenge).

In a more detailed manner, the checking device 30 generates a nonce, sends it via the channel to the secure chip. The latter calculates its signature using its private key: the chip hashes the nonce (with a cryptographic hash function), then encrypts (among other things) the hash using the private key, with a cryptographic function such as RSA, and sends the signature back in response to the checking device 30 which decrypts it with the public key and verifies that the hash of the nonce is indeed found.

It should be noted that the public key of one or the other of the mechanisms can itself be signed with a private key of a government body or issuer of an identity document in order to ensure that a false private/public key pair has not been placed on the electronic chip.

It is understood that in a particularly preferred manner, no datum other than the data necessary for said authentication of the electronic chip is transmitted via said secure communication channel, so as to retain the benefit of an absence of retrieval of the data contained on the chip.

As a function of the result of step (c) (and in particular of the active or hardware authentication), access to the zone is authorized or refused for the individual.

It should be noted that step (c) may comprise an additional biometric authentication of the individual. This step comprises comparing the reference biometric datum corresponding to the chip of the formally authenticated document with a new candidate biometric datum acquired for the same trait. This other datum can be a second biometric datum acquired by the checking device 30 (or by another checking device) exclusively for the purpose of authentication. This is especially the case if the biometric trait corresponds to a reference biometric datum other than the reference biometric datum corresponding to the first candidate datum, or else if there are several checking devices, for example in an airport, a first device at the border crossing and a second upon boarding.

Thus, the proposed method does away entirely with any reading of the automatic reading zone in the recurring checking process (the user can go from the entrance of the departure airport to the exit of the arrival airport without ever having to present the automatic reading zone) and further simplifies the handling of the identity document medium since the contactless communication can be much shorter, while ensuring the presence of the identity document during said check and allowing the individual to be checked using the data of said identity documents.

The invention claimed is:

1. A method for checking an individual having an identity document on a medium comprising an electronic chip in which a reference biometric datum of the individual is stored and capable of displaying an automatic reading zone representing a first optical reading datum of the identity document, the method comprising:
 carrying out by a checking device of:
 (a) acquiring a candidate biometric datum on a biometric trait of the individual;
 (b) retrieving, using the candidate biometric datum, a second optical reading datum, in a memory, associated with the reference biometric datum corresponding to the biometric trait of the individual, the second optical reading datum being retrieved by matching the candidate biometric datum to reference biometric datum and retrieving the second optical reading datum that is stored in correspondence with the reference biometric datum in the memory; and (c) opening a secure communication channel with the electronic chip of the medium of the individual's identity document using said retrieved second optical reading datum, wherein the method further comprises, before the acquiring and carried out by an enrollment device:

retrieving the reference biometric datum of the individual from said electronic chip;

acquiring the first optical reading datum of the identity document by reading the automatic reading zone; and recording, in said memory, the first optical reading datum of the identity document linked to the reference biometric datum of the individual as the second optical reading datum.

2. The method according to claim 1, wherein the opening does not include either retrieving the reference biometric datum of the individual from said electronic chip via said secure communication channel or reading said automatic reading zone of the identity document medium.

3. The method according to claim 2, wherein opening includes authenticating said electronic chip via said secure communication channel.

4. The method according to claim 1, wherein opening includes authenticating said electronic chip via said secure communication channel.

5. The method according to claim 4, wherein said electronic chip stores a private and public key pair, said authentication of said electronic chip being chosen from: an active authentication and a hardware authentication.

6. The method according to claim 4, wherein no datum other than data necessary for said authentication of the electronic chip is transmitted via said secure communication channel.

7. The method according to claim 5, wherein said authentication of said electronic chip is an active authentication including verification using said public key of an electronic signature received from the electronic chip in response to sending of a nonce.

8. The method according to claim 7, wherein no datum other than data necessary for said authentication of the electronic chip is transmitted via said secure communication channel.

9. The method according to claim 5, wherein no datum other than data necessary for said authentication of the electronic chip is transmitted via said secure communication channel.

10. The method according to claim 1, wherein said secure channel is opened according to a protocol chosen from: Basic Access Control (BAC), and Password Authenticated Connection Establishment (PACE), using a key derived from said retrieved second optical reading datum.

11. The method according to claim 1, wherein the retrieving the second optical reading datum further comprises:

comparing reference biometric data stored in the memory with the candidate biometric datum; and selecting at least one second optical reading datum of an identity document corresponding to at least one reference biometric datum having a rate of similarity with the candidate biometric datum greater than a predetermined threshold.

12. The method according to claim 11, wherein, when more than one second optical reading datum of an identity document has been selected, the opening is attempted for each second optical reading datum selected until the secure communication channel opens.

13. The method according to claim 1, wherein the checking device includes contactless communication means, the opening being carried out by placing said medium near the checking device in any given orientation.

14. The method according to claim 1, wherein the identity document is a passport, and during the retrieving the reference biometric datum, the acquiring the first optical reading datum, and the recording, the passport is presented to the enrollment device open on page of the automatic reading zone in order to acquire the first optical reading datum of the identity document, and during the opening, the passport is presented closed to the checking device.

15. The method according to claim 1, wherein during the carrying out by the checking device the document is presented closed to the checking device.

16. A device for checking an individual having an identity document on a medium comprising:

an electronic chip in which a reference biometric datum of the individual is stored and capable of displaying an automatic reading zone representing first optical reading datum of the identity document, the electronic chip being configured to:

(a) acquire a candidate biometric datum on a biometric trait of the individual;

(b) retrieve, using the candidate biometric datum, a second optical reading datum, in a memory, associated with a reference biometric datum corresponding to the biometric trait of the individual; and (c) open a secure communication channel with the electronic chip of the medium of the individual's identity document using said retrieved second optical reading datum, wherein before the electronic chip acquires the candidate biometric datum, an enrollment device is configured to retrieve the reference biometric datum of the individual from said electronic chip, acquire the first optical reading datum of the identity document by reading the automatic reading zone, and record, in said memory, the first optical reading datum of the identity document linked to the reference biometric datum of the individual as the second optical reading datum.

17. A system for checking individuals, comprising:

a memory;

a checking device according to claim 16; and an enrollment device configured to:

retrieve the reference biometric datum of the individual from said electronic chip;

acquire the optical reading datum from the identity document by reading the automatic reading zone; and record, in said memory, the optical reading datum of the identity document linked to the reference biometric datum of the individual.

18. A non-transitory computer-readable storage medium having stored thereon a computer program product having code instructions for executing a method according to claim 1 for checking an individual.

19. A method for checking an individual having an identity document on a medium comprising an electronic chip in which a reference biometric datum of the individual is stored and capable of displaying an automatic reading zone representing an optical reading datum of the identity document, the method comprising:
- carrying out by a checking device of:
  - (a) acquiring a candidate biometric datum on a biometric trait of the individual;
  - (b) retrieving, from the candidate biometric datum, an optical reading datum, in a memory, associated with the reference biometric datum corresponding to the biometric trait of the individual;
  - (c) opening a secure communication channel with the electronic chip of the medium of the individual's identity document using said retrieved optical reading datum; and
- before the acquiring and carried out by an enrollment device,
  - retrieving the reference biometric datum of the individual from said electronic chip,
  - acquiring the optical reading datum of the identity document by reading the automatic reading zone, and
  - recording, in said memory, the optical reading datum of the identity document linked to the reference biometric datum of the individual,
- wherein the identity document is a passport, and during the retrieving the reference biometric datum, the acquiring the optical reading datum, and the recording, the passport is presented to the enrollment device open on page of the automatic reading zone in order to acquire the optical reading datum of the identity document, and during the opening, the passport is presented closed to the checking device.

\* \* \* \* \*